United States Patent
Roine

(10) Patent No.: US 6,520,029 B1
(45) Date of Patent: Feb. 18, 2003

(54) DEVICE FOR MEASURING GAS FLOW

(75) Inventor: Johannes Roine, Espoo (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 0 days.

(21) Appl. No.: 09/486,085

(22) PCT Filed: Aug. 18, 1998

(86) PCT No.: PCT/FI98/00636

§ 371 (c)(1),
(2), (4) Date: May 10, 2000

(87) PCT Pub. No.: WO99/09376

PCT Pub. Date: Feb. 25, 1999

(30) Foreign Application Priority Data

Aug. 19, 1997 (FI) .................................................. 973395

(51) Int. Cl.⁷ ................................................ G01F 1/46
(52) U.S. Cl. .................................................. 73/861.65
(58) Field of Search .................. 137/487; 73/861.66, 73/861.65, 202, 861.63, 863, 861, 861.67, 189; 318/644

(56) References Cited

U.S. PATENT DOCUMENTS

| | | | | |
|---|---|---|---|---|
| 4,506,553 A | * | 3/1985 | Bruce et al. .............. | 73/861.65 |
| 5,172,592 A | | 12/1992 | Fisher ...................... | 73/861.65 |
| 5,365,795 A | * | 11/1994 | Brower, Jr. .............. | 73/861.65 |
| 5,440,217 A | * | 8/1995 | Traina ......................... | 318/644 |
| 5,509,313 A | * | 4/1996 | Traina et al. ............. | 73/861.65 |

FOREIGN PATENT DOCUMENTS

| | | |
|---|---|---|
| EP | 620419 | 10/1994 |
| EP | 704681 | 4/1996 |

OTHER PUBLICATIONS

Patent Abstracts of Japan, vol. 6, No. 51, P–108 Abstract of JP 56–164960 A ((Hitachi Seisakusho K.K.) Dec. 18, 1981.
Patent Abstracts of Japan, vol. 13, No. 19, P–814 Abstract of JP 63–223567 A (Agency of Science & Technology), Sep. 19, 1988.

* cited by examiner

Primary Examiner—Harshad Patel
(74) Attorney, Agent, or Firm—Andrus, Sceales, Starke & Sawall, LLP

(57) ABSTRACT

The invention relates to a device and a procedure for measuring the flow of a gas or gas mixture in a flow channel (7), said device comprising a frame (10), which comprises measuring space (8), a measuring duct (6), which is mounted on the frame between the flow channel and the measuring space and which is open at both ends (2, 9) to pass the pressure wave generated by the flow from the measuring duct into the measuring space, and a measuring element (1) mounted on the frame and used to measure the pressure wave, said measuring element being disposed near the second end (9) of the measuring duct. According to the invention, the measuring duct is disposed in a substantially perpendicular orientation relative to the direction of flow the gas or gas mixture and so that it can rotate about its longitudinal axis, the measuring duct comprises a first orifice (4), which is disposed at the first end (2) of the measuring duct and faces alternately in the direction of flow and against the flow to pass a changing and cyclic pressure wave into the measuring duct, and the measuring duct comprises a second orifice (3), which is disposed in the part of the measuring duct extending into the measuring space to equalize the static pressures in the measuring space and measuring duct.

12 Claims, 1 Drawing Sheet

DEVICE FOR MEASURING GAS FLOW

The present invention relates to a device as defined in the preamble of claim 1 for measuring the flow of a gas or gas mixture a flow channel. Furthermore, the invention relates to a procedure as defined in the preamble of claim 9 for measuring the flow of a gas or gas mixture in a flow channel.

In prior art, a so-called Pitot tube is known, which is used to measure the flow of a gas or gas mixture in a flow channel. In a Pitot tube application, the tube comprises two sensors, one of which is used to measure the normal pressure in the flow channel and the other to measure the pressure generated in the sensor by the flow. Such sensors may be e.g. tubes, one of which has been bent against the direction of flow so that the flow enters the tube in a substantially perpendicular direction while the other is oriented in the direction of flow and measures the internal pressure in the flow channel. The pressure difference thus obtained is proportional to the square of the prevailing flow.

Where the gas or gas mixture to be measured contains large particles, condensation liquids and corroding substances, conventional sensors inserted from outside the flow channel are unreliable because static Pitot tubes are liable to get clogged up and gather condensation liquid.

The object of the present invention is to eliminate the drawbacks mentioned above.

A specific object of the present invention is to produce a device that it simple and cheap.

A further specific object of the invention is present a procedure in which the measuring duct, i.e. sensor, cannot be clogged up.

The device of the invention is characterised by what is presented in claim 1.

The device of the invention comprises a frame, a measuring duct and a measuring element. The device is connected to a flow channel, in which the flow of a gas or gas mixture is measured. The frame further comprises a measuring space. The measuring duct is mounted on the frame between the flow channel and the measuring space. The measuring duct is open at both ends, so that a pressure wave generated in the duct by the flow can advance into the measuring space. The measuring element is placed near the second end of the measuring duct in the measuring space and it is used to measure the pressure wave.

According to the invention, the measuring duct is disposed in a substantially perpendicular orientation relative to the direction of flow of the gas or gas mixture and so that it can rotate about its longitudinal axis. The measuring duct comprises a first orifice, which is disposed at the first end of the measuring duct and alternately in the direction of flow and against the flow to admit a changing and cyclic pressure wave into the measuring duct. The measuring duct further comprises a second orifice, disposed in that part of the measuring duct which extends into the measuring space to equalise the static pressures in the measuring space and measuring duct.

In an embodiment of the device, the diameter of the first orifice is larger than the inner diameter of the measuring duct to allow unimpeded generation of a pressure wave in the measuring duct. The orifice is preferably of a circular or oval form.

In an embodiment of the device, the device comprises a power means, preferably an electric motor, which is mounted on the frame and connected to the measuring duct, preferably by means of a V-belt, to rotate the measuring duct.

In an embodiment of the device, the measuring element is a microphone, loudspeaker or equivalent, which is used to convert the pressure wave into an electric signal. The device may comprise one or more measuring elements. For instance, in an arrangement comprising two microphones, the measuring duct may be a double tubular structure comprising two tubes one inside the other, forming two separate flow routes.

In an embodiment of the device, the measuring duct is connected to the flow channel and measuring space via airtight and watertight joints to ensure that external disturbances, e.g. air flow and splashes of liquid, will not produce errors in the measurement.

In an embodiment of the device, a protective air stream flowing into the measuring space is used so that the protective air flows into the measuring space and through the measuring space further via the measuring duct into the flow space. This prevents impurities from entering from the flow channel into the measuring duct and further into the measuring space.

In an embodiment of the device, the part of the measuring duct extending into the flow channel is provided with one or more orifices disposed at different angles relative to the radius perpendicular to the longitudinal axis of the measuring duct. In this case, cyclic pressure waves changing in different phase are passed into the measuring duct.

In an embodiment of the device, the device comprises means for the processing and shaping of an electric signal. These means may comprise a signal filter and a converter element. The signal filter filters the electric signal in a manner known in itself to eliminate any frequencies that differ from a sinusoidal signal. The converter element converts, in a manner known in itself, an analogue signal into a digital signal, which can be processed e.g. using a computer.

In the procedure of the invention, the measuring duct is rotated in a substantially perpendicular orientation to the flow, with the result that the first orifice comprised the measuring duct is alternately in the direction of flow and against the flow. Thus, a changing and cyclic pressure wave generated in the measuring duct through the orifice is passed into the measuring element, and the changing and cyclic pressure wave is converted in the measuring element into an electric signal, whereupon the flow is determined on the basis of the amplitude of the electric signal.

In an embodiment of the procedure, a sinusoidal signal is separated from the electric signal by filtering out all other signals. This produces a signal of a constant wavelength.

In an embodiment of the procedure, the measuring duct is rotated at a constant speed.

In an embodiment of the procedure, the flow is computed based on the formula $v^2 = \Delta P$, where v=flow and $\Delta P$=pressure difference, which is proportional to the amplitude of the electric signal.

The invention makes it possible to use the device in unclean conditions where the gas in the flow to be measured may contain e.g. large particles, condensation liquid and corroding substances. Disturbance cumulation in the measurement works continuously. The device is easy and cheap to construct and therefore also to maintain. Calibration of the measurement can always be successfully carried out in unclean conditions. The device can be used for measurements at high pressures because the measuring space can be implemented as a small and therefore pressure-resistant space.

BRIEF DESCRIPTION OF THE SEVERAL VIEWS OF THE DRAWING

In the following, the invention will be described in detail by referring to the attached drawings, wherein FIG. 2 presents a measuring duct according to

DETAILED DESCRIPTION OF THE INVENTION

Figure 1:
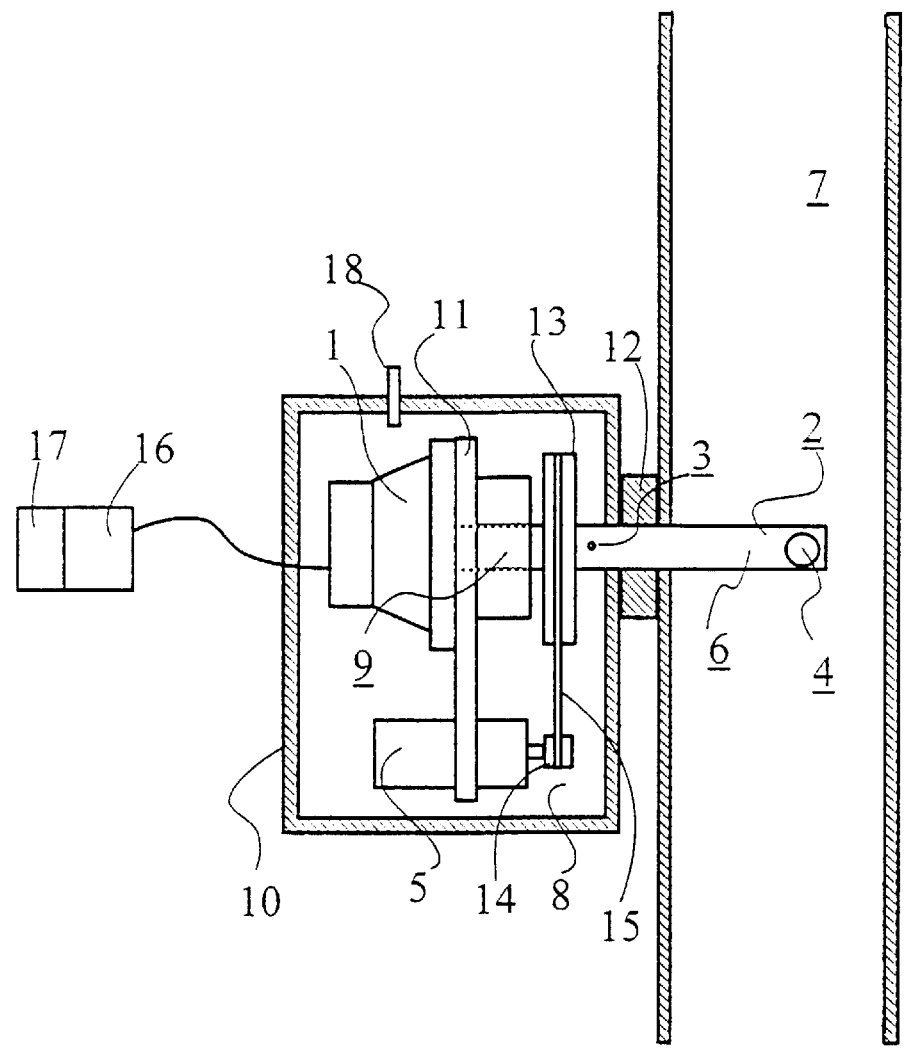
FIG. 1 presents a device according to the invention.

The device presented in FIG. 1 comprises a frame 10, a measuring space 8, a measuring element 1, a supporting element 11, a measuring duct 6, orifices 3,4, a sealing ring 12, a belt pulley 13 connected to the measuring duct, a power means 5, a belt pulley 14 connected to the power means, a belt 15 and an element 18 for the supply of protective gas, a signal filter 16 and a converter element 17. The device is connected to a flow channel 7. This connection may be a standard valve connection.

In the embodiment illustrated by FIG. 1, the device comprises a sealing ring 12 placed between the frame 10 and the flow channel 7, preferably provided with rubber seals, to make the joint airtight and watertight. Attached to the frame 10 is a supporting element 11, on which the measuring element 1 and the power means are mounted. The measuring duct 6 is connected between the measuring space 8 and the flow channel 7, preferably supported by bearings.

In the part extending into the measuring space 8, a belt pulley 13 is mounted on the measuring duct 6. Attached to the power means 5 is another belt pulley 14, and the pulleys 13,14 are connected by a belt 15.

The first end 2 of the measuring duct 6 is provided with a first orifice 4, whose diameter is larger than the inner diameter of the measuring duct 6. The measuring duct 6 has a second orifice 3 between the belt pulley 13 and the frame. The second end 9 of the measuring duct 6 is disposed near the measuring element 1.

Figure 2:
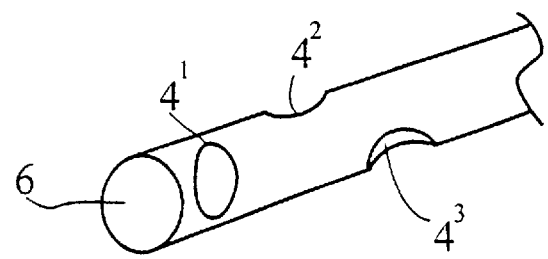

FIG. 2 presents a measuring duct 6 provided with three orifices $4^1$, $4^2$, and $4^3$, which serve to generate pressure waves with a phase difference between them.

By means of the belt 15, the power means 5 drives the measuring duct 6 at a constant speed of rotation. The constant speed of the power means 5 can be adjusted in a manner known in itself. As a result of the flow of the gas or gas mixture, the rotation of the measuring duct 6 and the orifice 4, a changing and continuous pressure wave is generated in the measuring duct because the orifice 4 faces alternately against the flow and in the direction of the flow. When the orifice 4 faces against the flow, the pressure wave in the measuring duct 6 is at a maximum, and when the orifice 4 faces in the direction of the flow, the pressure wave in the measuring duct 6 is at a minimum. The measuring duct 6 passes the pressure wave to the second end 9 of the measuring duct 6, which is close to the measuring element 1. The changing pressure wave produces a movement in the measuring element 1, and this movement is converted in the measuring element 1 into an electric signal. The measuring element is electrically connected to a signal filter 16, which filters out all unnecessary components from the signal, so that only the sinusoidal component remains in the signal. The signal filter 16 is electrically connected to a converter element 17, which converts the signal from a continuous-time form into a discrete-time form, in other words, performs an A/D conversion on the signal. This allows the signal to be fed e.g. into a computer for further processing.

The second orifice 3 stabilises the pressures in the measuring space 8 and in the measuring duct to an equal level.

Via the protective gas supply element 18, protective gas can be supplied into the measuring space 8 and further into the measuring duct 6. Therefore, impurities will not be easily admitted from the flow channel 7 into the measuring duct 6.

As illustrated by FIG. 2, the measuring duct 6 can be provided with three orifices $4^1$, $4^2$ and $4^3$, in which case three pressure waves with a phase difference between them will be generated in the measuring duct 6.

The invention is not restricted to the examples of its embodiments described above, but many variations are possible within the scope of the inventive idea defined by the claims.

What is claimed is:

1. A device for measuring a gas flow or a gas mixture flow moving in a flow channel (7) in a given direction, said device comprising:

a frame (10) comprising a measuring space (8), a rotatable single tubular measuring duct (6) mounted on the frame and having a first end extending into the flow channel and a second open end disposed in the measuring space, said duct having at least one sidewall orifice formed near the first end of the duct and exposable to the gas flow as the measuring duct rotates in the flow channel to develop a pressure in the measuring duct and an open second end to pass the pressure generated by the gas flow from the measuring duct into the measuring space, and a measuring element (1) mounted on the frame and positioned to measure the varying pressure generated in the measuring duct as the measuring duct rotates in the gas flow, said measuring element being disposed near the second end (9) of the measuring duct, wherein the measuring duct is disposed in a substantially perpendicular orientation relative to the direction of the gas flow, wherein the measuring duct is rotatable about the longitudinal axis of the measuring duct, and the measuring duct comprises a first sidewall orifice (4), which is disposed at the first end (2) of the measuring duct and faces alternately in the direction of flow and against the flow as the measuring duct rotates to create a changing and cyclic pressure wave in the measuring duct, characterized in that the measuring duct comprises a second sidewall orifice (3), which is disposed in that part of the measuring duct which extends into the measuring space to equalize the pressure in the measuring space and the pressure in the measuring duct.

2. Device as defined in claim 1, characterized in that the first orifice (4) is circular and has a diameter larger than an inner diameter of the measuring duct (6).

3. Device as defined in claim 2, further comprising a power means (5), which is connected to the measuring duct (6) to rotate the measuring duct.

4. Device as defined in claim 1, further comprising a microphone which serves to convert the pressure wave created in the measuring duct into an electric signal, and that the device comprises one or more measuring elements ($1^1$, $1^2$, ... $1^n$).

5. Device as defined in claim 1, characterized in that the measuring duct (6) is connected to the flow channel (7) and to the measuring space (8) in an airtight and watertight manner.

6. Device as defined in claim 1, further comprising a supply of protective air flowing into the: measuring space (8) to prevent impurities from entering into the measuring duct (6) Land into the measuring space.

7. Device as defined in claim 1, characterized in that the first end of the measuring duct (6) extending into the flow channel (7) is provided with a plurality of orifices ($4^1$, $4^2$, and $4^3$) disposed at different angles relative to a radius perpendicular to a longitudinal axis of the measuring duct, wherein the rotation of the measuring duct creates cyclic pressure waves changing in different phase in the measuring duct.

8. Device as defined in claim 1, further comprising means (16, 17) for the processing and shaping of an electric signal.

9. A device for measuring the flow of a gas or gas mixture in a flow channel comprising:

- a frame (10) comprising a measuring space (8),
- a rotatable single tubular measuring duct (6), which is mounted on the frame and has a first end extending into the flow channel and a second open end disposed in the measuring space and said duct having at least one orifice (4) exposable to the flow in said first end and an open second end to pass a pressure wave generated in the measuring duct by the flow during rotation of the measuring duct from the measuring duct into the measuring space, and
- a measuring element (1) mounted on the frame and used to measure the pressure wave, said measuring element being disposed near the second end (9) of the measuring duct, wherein
  the measuring duct is rotated in a plane substantially perpendicular to the flow, with the result that the orifice (4) alternately faces in the direction of flow and against the flow,
  the changing and cyclic pressure wave generated in the measuring duct through the orifice is passed into the measuring element,
  the changing and cyclic pressure wave is converted in the measuring element into an electric signal, characterized in that
  the pressure in the measuring space is equalized continuously to the pressure in the flow channel by means of a second orifice (3) which is formed in the portion of the measuring duct that extends into the measuring space, and
  the flow is determined on the basis of the amplitude of the electric signal.

10. Device as defined in claim 9, characterized in that a sinusoidal signal is separated from the electric signal by filtering out substantially all other signals.

11. Device as defined in claim 10, characterized in that the measuring duct (6) is rotated at a constant speed.

12. Device as defined in claim 9, characterized in that the flow is computed based on the formula $v^2=\Delta P$, where v=flow and $\Delta P$=pressure difference between the dynamic and static pressures prevailing in the flow channel, i.e. amplitude of the electric signal.

* * * * *